3,146,244
SELECTIVE BROMINATION OF ISOLATED DOUBLE BONDS IN STEROIDAL COMPOUNDS
Octavio Mancera and Enrique Batres, Mexico City, Mexico, assignors to Syntex Corporation, Panama, Panama, a corporation of Panama
No Drawing. Filed July 23, 1962, Ser. No. 211,833
Claims priority, application Mexico Aug. 9, 1961
10 Claims. (Cl. 260—397.3)

The present invention relates to a method for the selective bromination of isolated double bonds in steroidal compounds, and to the application of this reaction to the improvement in the preparation of $\Delta^4$-3-keto androstenes and pregnenes starting from the corresponding $\Delta^5$-3-hydroxy steroids.

Several methods have been employed for the preparation of $\Delta^4$-3-keto-androstenes and $\Delta^4$-3-keto-pregnenes from the $\Delta^5$-3-hydroxy steroids, the main methods being the Oppenauer method, that is, the oxidation with aluminum isopropoxide or terbutoxide in the presence of a proton acceptor such as cyclohexanone or acetone, and the oxidation with chromic acid. In the latter case it is necessary to temporarily protect the double bond at C–5,6 by the addition of bromine, which is then removed after the oxidation, as for example, by reaction with zinc dust, and finally the double bond is rearranged to the C–4,5 position by acid treatment, thus forming the desired $\alpha,\beta$-unsaturated ketone.

The yields obtained through the Oppenauer method vary from 65 to 75%. In the case of the chromic acid oxidation the yields obtained are also low due to the fact that during the bromination, previous to the oxidation, under the conditions employed so far, there is introduced bromine at other active positions of the steroidal molecule. Thus, for example, in the preparation of progesterone from $\Delta^5$-pregnenolone, the product obtained contains variable amounts of halogen (probably at C–17) even when the debromination is effected under rather drastic conditions. The presence of the halogen makes the purification of the products more difficult, with the consequent lowering of the yields. In the preparation of $\Delta^4$-androstenedione from $\Delta^5$-androsten - 3$\beta$ - ol - 17 - one, bromination may also occur at the C–16 position adjacent to the keto group, thus producing again a lower yield of the final product.

There has also been employed the method of oxidation with chromic acid in acetone solution and in sulfuric acid medium, followed by acid treatment, to produce the $\alpha,\beta$-unsaturated ketone; however, it seems that under the conditions employed the steroid is rapidly oxidized at 3, but then the attack continues at other positions, thus affording complex mixtures which after chromatography produce a low yield of the $\Delta^4$-3-ketone.

In accordance with the method of the present invention, the surprising discovery has been made that by reacting a $\Delta^5$-3-hydroxy steroid with one molar equivalent of bromine, in the presence of catalytic amounts of an amine, there are exclusively obtained the 5$\alpha$,6$\beta$-dibromo compounds. Under these conditions the bromination at other positions of the steroidal molecule is practically inhibited and any excess of bromine remains unreacted. Specifically there is inhibited the bromination at C–17 and C–21 when the starting compound is a derivative of pregnenolone, and at C–16 in the case of the 17-keto-androstanes. The novel method is generally applied to the selective bromination of isolated double bonds at any position of the steroidal molecule; thus, for example, such selective bromination may be carried out in compounds possessing an isolated double bond at C–2, C–5, C–7, C–9(11), C–14(15), etc. In the case of compounds possessing double bonds conjugated with keto groups, as for example in the case of $\Delta^{5,16}$-pregnadien-3$\beta$-ol-20-one, there is exclusively obtained the 5$\alpha$,6$\beta$-dibromo compound.

The reaction of selective bromination of isolated double bonds, object of the present invention, is conducted by using a slight excess of bromine, preferably 1.05 molecular equivalents of halogen, in a solvent inert to this reaction and in the presence of an amine, so as to produce an alkaline reaction medium.

In our method there may be employed lower aliphatic primary, secondary or tertiary amines, such as ethylamine, propylamine, acetylamine, methylethylamine, triethylamine, etc., or aromatic amines such as pyridine, piperidine, $\gamma$-collidine, 2,4-lutidine, etc.

Adequate solvents for this bromination are the lower aliphatic halogenated hydrocarbons such as methylene chloride, ethylene chloride, chloroform or carbon tetrachloride. There may also be employed as solvents the saturated cyclic ethers such as dioxane or tetrahydrofurane.

The reaction is conducted at low temperature, preferably between $-5$ and $0°$ C., and slowly adding the solution of bromine in the same solvent employed for dissolving the steroid, and maintaining the temperature around $0°$ C. After all the bromine has been added the mixture is kept standing for 5 to 15 minutes further, and the dibromo compound thus formed may then be isolated if desired.

When the bromination described above is applied only with the purpose of protecting the double bond, as for example in the synthesis of progesterone from $\Delta^5$-pregnenolone, the oxidation with chromic acid may be conducted directly in the same medium where the bromination was effected, without isolating the dibromo compound.

The method of bromination herein described is of great utility, for example in the synthesis of progesterone and androstenedione starting from $\Delta^5$-pregnenolone and $\Delta^5$-androsten-3$\beta$-ol-17-one, where the double bond at C–5,6 is thus protected before the oxidation with chromic acid; the yields obtained by this method are of 80 to 85%, that is, about 10 to 15% higher than the yields obtained by the methods available so far, in the case of either progesterone or androstenedione.

The following examples serve to illustrate but are not intended to restrict the scope of the invention:

*Example I*

In a 3 neck, 12 lt. round bottom flask, there was prepared a solution of 250 g. of $\Delta^5$-pregnen-3$\beta$-ol-20-one in 1500 ml. of methylene chloride. About 500 ml. of solvent was distilled in order to remove moisture by azeotropic distillation, then 6.25 g. of anhydrous pyridine was added and the solution was cooled to $-5°$ C. in an ice-salt bath.

In the absence of light and under vigorous stirring, there was then slowly added 132.8 g. of bromine in 300 ml. of methylene chloride, while maintaining the temperature of the mixture below $0°$ C.; after all the bromine had been added the mixture was stirred for 10 minutes further.

There were then added 150 ml. of methylene chloride, 1500 ml. of acetic acid and 155 ml. of water and the temperature was allowed to rise to $15°$ C.; under vigorous stirring and controlling the temperature between $15°$ and $17°$ C., there was then added a solution of 106 g. of chromic acid in 90 ml. of water and 150 ml. of acetic acid and the mixture was stirred for 3 hours at room temperature. Water was added, the organic layer was separated and the aqueous layer was extracted several times with methylene chloride; the combined extract was washed with water to neutral and to the organic extract thus obtained there was added 950 ml. of methanol followed by 125 g. of zinc dust which was added over a period of 15 minutes with stirring.

The resulting mixture was refluxed for 30 minutes, the excess of zinc was removed by decantation and washed with methylene chloride so as to afford a final volume of 3 lt. of solution.

The solution was cooled to room temperature and treated with 60 ml. of concentrated hydrochloric acid, taking care that the temperature does not exceed 32° C.; it was kept standing at 25–30° C. for 10 minutes, then diluted with water and the organic phase was separated and washed with water, with 5% sodium carbonate solution and with water to neutral, dried over anhydrous sodium sulfate and evaporated to dryness under vacuum. Crystallization of the residue from methanol afforded progesterone with M.P. 128–129.5° C., with a weight yield of 83 to 85%.

*Example II*

From a solution of 250 g. of $\Delta^5$-androsten-3$\beta$-ol-17-one in 700 ml. of methylene chloride there was distilled 250 cc. of solvent in order to remove moisture by azeotropic distillation; 6.25 ml. of anhydrous pyridine was added and the solution was cooled to −5° C.; under vigorous stirring and maintaining the temperature between 0 and −5° C., there was then added a solution of 290.9 g. of bromine in 600 ml. of methylene chloride and the reaction mixture was kept standing for 10 minutes further. After diluting with water the organic layer was separated, washed with water, dried and evaporated to dryness, thus affording 5$\alpha$,6$\beta$-dibromo-androstan-3$\beta$-ol-17-one in almost quantitative yield.

In accordance with the method described in Example I, the above dibrominated product was oxidized with chromic acid in mixture with acetic acid and methylene chloride, and the 5$\alpha$,6$\beta$-dibromo-androstanedione thus obtained was debrominated with zinc dust and then treated with hydrochloric acid; there was thus obtained as final product $\Delta^4$-androstene-3,17-dione (in 92.5% weight yield) having a melting point of 172–174° C.; $[\alpha]_D$ +191° (chloroform), $\lambda$ max. 240 m$\mu$, $E_{1\,cm}^{1\%}$ 586

*Example III*

The method of Example I was repeated, but using in the bromination anhydrous diethylamine or piperidine instead of pyridine. After the oxidation, debromination and treatment with hydrochloric acid, there was obtained progesterone in a similar yield to that obtained in such example.

*Example IV*

A solution of 50 g. of $\Delta^{5,16}$-pregnadien-3$\beta$-ol-20-one in 200 ml. of chloroform free of alcohol and recently distilled was treated with 1.25 ml. of anhydrous pyridine and then with 30 g. of bromine (1.05 equivalents) in 80 ml. of pure chloroform, under vigorous stirring and maintaining the temperature between −10 and 0° C. The mixture was kept standing for 10 minutes further, washed with water, with sodium thiosulfate solution and again with water, dried over anhydrous sodium sulfate and evaporated to dryness under vacuum, thus yielding 5$\alpha$,6$\beta$-dibromo-$\Delta^{16}$-pregnen-3$\beta$-ol-20-one. The residue was dissolved in 200 ml. of methylene chloride, oxidized with chromic acid, debrominated with zinc and finally treated with hydrochloric acid, in accordance with the method described in Example I, thus furnishing $\Delta^{4,16}$-pregnadiene-3,20-dione in 80% weight yield.

*Example V*

To a solution of 5 g. of $\Delta^{4,9(11)}$-pregnadiene-3,20-dione in 75 ml. of anhydrous carbon tetrachloride there was added under stirring 3 drops of pyridine, cooled to −5 to 0° C. and treated dropwise with a solution of 3 g. of bromine (1.05 equivalents) in 20 ml. of carbon tetrachloride. The resulting mixture was stirred for 10 minutes further, water was then added and the organic phase was separated and washed with water, 5% sodium thiosulfate solution and again with water until neutral, dried over anhydrous sodium sulfate and evaporated to dryness. Crystallization of the residue from acetone-hexane yielded 9$\alpha$,11$\beta$-dibromo-$\Delta^4$-pregnene-3,20-dione.

*Example VI*

The method of Example V was repeated but there was substituted the pyridine by collidine, thus obtaining also 9$\alpha$,11$\beta$-dibromo-progesterone in similar yield to that obtained in such example.

We claim:

1. A process for brominating isolated double bonds unconjugated with a keto group in a steroidal compound selected from the group consisting of the androstane and pregnane series, which process comprises treating the steroid with 1 molar equivalent of bromine, at low temperature and in the presence of a catalytic amount of an amine.

2. In the method for preparing progesterone from $\Delta^5$-pregnen-3$\beta$-ol-20-one, which method comprises protecting the double bond at C–5 by the addition of bromine, oxidizing the hydroxyl group at C–3 with chromic acid, debrominating the resulting 3-ketone with zinc and converting the thus obtained $\Delta^5$-pregnene-3,20-dione into the $\alpha$,$\beta$-unsaturated ketone, the improvement which comprises effecting the bromination at a temperature between −5° and 0° C. in the presence of catalytic amounts of an amine and an inert solvent.

3. The process of claim 2 wherein the amine is pyridine.

4. The process of claim 2 wherein the inert solvent is a lower aliphatic chlorinated hydrocarbon.

5. The process of claim 2 wherein the inert solvent is methylene chloride.

6. In the method for preparing $\Delta^4$-androstene-3,17-dione from $\Delta^5$-androsten-3$\beta$-ol-17-one which method comprises protecting the double bond at C–5 by the addition of bromine, oxidizing the hydroxyl group at C–3 with chromic acid, debrominating the resulting 3-ketone with zinc and converting the thus obtained $\Delta^5$-androstene-3,17-dione into the $\alpha$,$\beta$-unsaturated ketone the improvement which comprises effecting the bromination at a temperature between −5° and 0° C. in the presence of catalytic amounts of an amine and an inert solvent.

7. The method of claim 6 wherein the amine is pyridine and the inert solvent is methylene chloride.

8. The process of claim 1 wherein the amine is diethylamine.

9. The process of claim 1 wherein the amine is piperidine.

10. The process of claim 1 wherein the amine is pyridine.

No references cited.